United States Patent [19]

Miller

[11] 3,854,408

[45] Dec. 17, 1974

[54] TRAFFIC NETWORK SYSTEM

[76] Inventor: Richard Montgomery Miller, 2700 Oakland Ave., Chula Vista, Calif. 75014

[22] Filed: Mar. 5, 1973

[21] Appl. No.: 337,904

[52] U.S. Cl. .................. 104/124, 104/91, 104/96, 104/27
[51] Int. Cl. ........................................... E01b 25/22
[58] Field of Search .......... 104/88, 89, 91, 96, 103, 104/123, 118, 124, 125, 130, 131, 105

[56] References Cited
UNITED STATES PATENTS

| | | | |
|---|---|---|---|
| 3,318,261 | 5/1967 | Garcia | 104/131 |
| 3,626,857 | 12/1971 | Omar | 104/131 |
| 3,760,740 | 9/1973 | Jacobs | 104/88 |

*Primary Examiner*—Lloyd L. King
*Assistant Examiner*—D. W. Keen
*Attorney, Agent, or Firm*—Patrick J. Schlesinger; Charles C. Logan, II

[57] ABSTRACT

A monorail transportation system is disclosed which has a number of tracks for carrying vehicles in a corresponding number of directions. To minimize the amount of supporting land required and to permit traversing vehicles to change directions of travel without undergoing gradient motion, the mainline tracks are mounted at different elevations.

5 Claims, 3 Drawing Figures

PATENTED DEC 17 1974 3,854,408

TRAFFIC NETWORK SYSTEM

BACKGROUND OF THE INVENTION

This invention relates generally to transportation systems and more particularly concerns a monorail system compactly arranged for efficient utilization of urban space.

Considerable concern is presently being expressed by many segments of society about the efficient, swift, and inexpensive transportation of large numbers of persons within crowded urban areas. It is becoming increasingly apparent that such transportation is essential to the continued existance and growth of large cities.

The sprawl of cities makes it inevitable that many persons must travel long distances from their residences to their places of work, to entertainment sites, to shopping areas, and to business and governmental offices. For persons of modest means, the fares for such transportation can impose such financial hardship that access to remote employment opportunity sites and other areas are practically denied. To everyone associated with an urban environment, travel between distant locations in the city can be a lengthy, frustrating, expensive, and sometimes dangerous journey. Indeed, statistics show that travel between designated points in some urban areas now often requires the same amount of time as was required a hundred years ago.

It is generally understood that while transportation by automobile or like private conveyance is extremely flexible, the attendant urban congestion, pollution, and danger to life and property are now unacceptable. It is also generally understood that alternate transportation systems, i.e., public transportation systems, are excessively expensive and contribute to other urban problems. More specifically, many rail transportation systems such as subways, elevated trains, and railroads require the use of large amounts of urban land. Elevated track right of ways provide a source of noise and dirt. Moreover, when supported by earthen embankments, or numerous heavy pillars, such right of ways often serve as unintentional sociological as well as physical barriers, severing portions of the community from otherwise adjacent neighborhoods. It is thus becoming increasingly clear that urban transportation systems which used fixed track layouts cannot be permitted to excessively interfere with the function and aesthetics of surrounding environments.

Considerable interest recently has been awakened in transportation systems better designed for use in congested urban areas. Some such systems, popularly referred to as "monorail systems," envision the installation of unobtrusive elevated rail layouts extending throughout an urban area; the rails can be traversed by relatively small, cab-like suspended vehicles. Such vehicle units can be individually programmed by the occupants to travel swiftly, quietly and comfortably to any one of a number of boarding and deboarding stations.

However, some such monorail or other tracked urban transit systems have not fully addressed the problems of physical obtrusiveness and minimization of land usage. These systems provide side-by-side tracks comprising a mainline right of way; and the total width of such a right of way can be extensive. Clearance for the passage of cars travelling in opposite directions must be provided, of course, and if the cars are to pass one another at high speed, additional separation must be provided to avoid car sway caused by wind buffet. Such car sway is uncomfortable for the passengers and can be dangerous under some conditions.

It is thus the general object of the present invention to provide a transportation system for use in urban areas which will emphasize the unobstrusive character of the track layout, and which will require minimal amounts of urban land for use as stations and track right of ways.

It is another object of the invention to provide a transportation system having an unobtrusive track layout which permits a relatively large number of unitized traversing vehicles to quickly, quietly, and comfortably transport people to any of a number of stations upon the system.

It is another object to provide a track layout which minimizes car buffet and right of way width.

Other objects and advantages of the invention will become apparent upon reading the following detailed description and upon reference to the drawings. Throughout the description, like reference numerals refer to like parts.

DETAILED DESCRIPTION

While the invention will be described in connection with a preferred embodiment, it will be understood that it is not intended to limit the invention to that embodiment. On the contrary, it is intended to cover all alternatives, modifications and equivalents as may be included within the spirit and scope of the invention.

Figure 1:
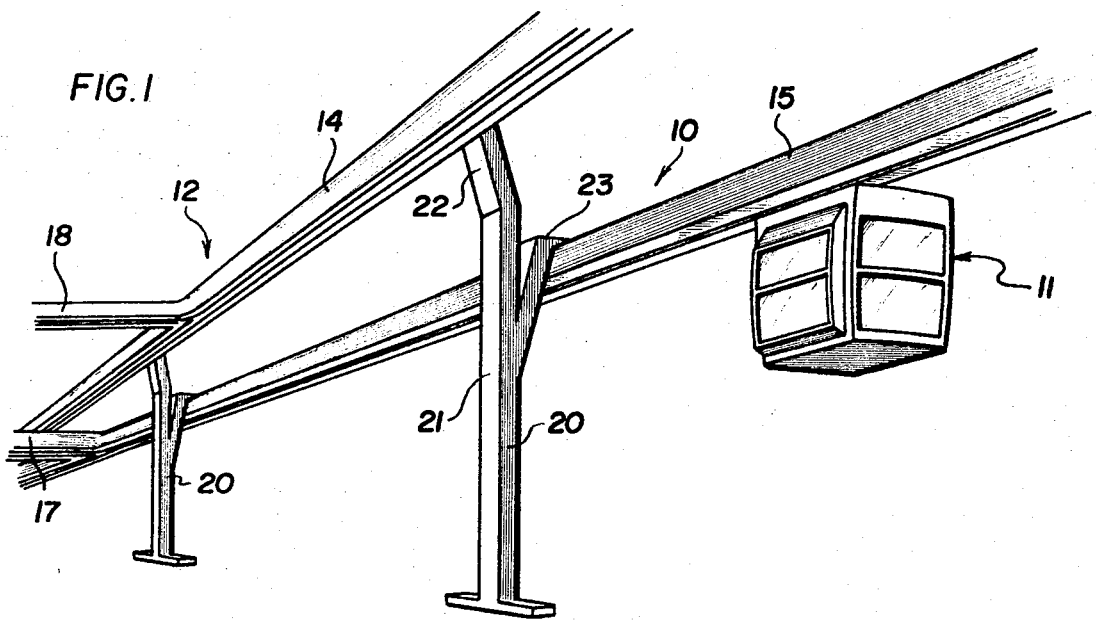
FIG. 1 is a fragmentary perspective view showing a portion of the transportation system, and including a portion of a typical track layout arrangement and a typical traversing unit.
Figure 2:
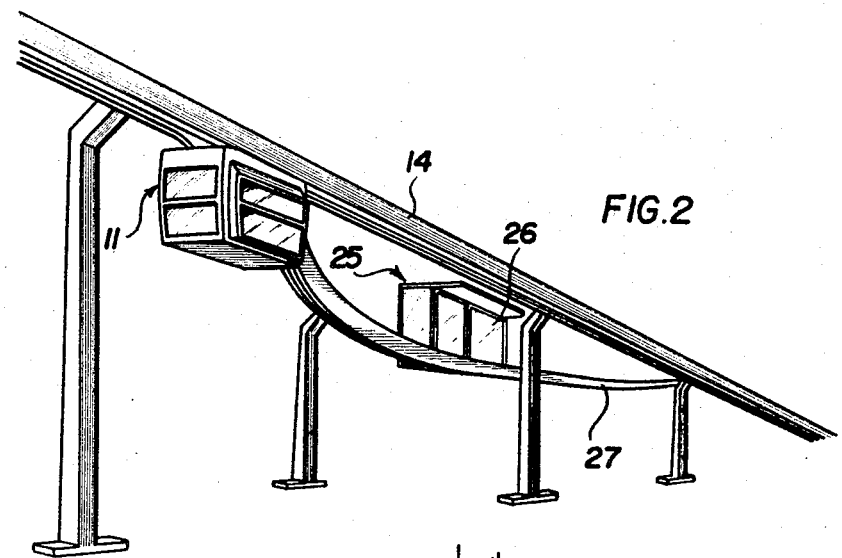
FIG. 2 is a fragmentary perspective view showing a typical mainline track, a traversing vehicle and a boarding and deboarding station.

Turning first to FIGS. 1 and 2, there is shown a vehicle transportation system 10 having a number of traversing vehicles 11 mounted for movement along a track layout 12. The track layout 12 requires a minimum amount of underlying ground area for system support and utilization. In accordance with this aspect of the invention, the track layout includes a first main line track 14 adapted for one-way movement of vehicular traffic in a given direction, and another main line track 15 adapted for one-way movement of vehicular traffic in another direction, the two tracks 14 and 15 are separated by a relative elevation or grade level. This elevational separation is sufficient to permit vehicles moving along one track to pass across the other track without substantial gradient motion. Where a mainline involves tracks connecting between relatively distant points, the tracks 14 and 15 may be oriented substantially parallel to one another and offset as illustrated.

In order to service stations (not shown) located at points off the mainline, the mainline tracks 14 and 15 may also be provided with various connecting turn-off tracks 17 and 18 to permit the moving vehicles 11 to substantially change their direction of travel and pass across the other mainline track without substantial gradient motion. In this illustrated embodiment, the turnoff track 17 permits the vehicle 11 to cross the mainline track 14 for travel to an off-line station. A mating turn-off track 18 is provided to permit cars to move from the station to the mainline track 14 for travel in the opposite direction. It will be understood that a change-over lane (not shown) interconnecting the two mainline tracks 14 and 15 can be used by the vehicles 11 to move from one mainline track 15 to another mainline track 14 for motion in an opposite direction.

The illustrated monorail system contemplates a track layout elevated above a supporting ground level to minimize the amount of supporting land required. To permit free motion of the vehicles across adjacent mainline tracks and over the supporting ground level in accordance with another aspect of the invention, the difference in relative elevations between the tracks 14 and 15 is greater than the vertical height of any of the supported vehicles 11.

The elevated track system 12 can be supported by spaced stanchions 20. Intrusion into supporting space volume is minimized by including a single pillar 21 carrying a number of projecting arms 22, 23 for supporting the corresponding tracks 14 and 15.

Passenger access to and from the system vehicles 11 is provided through a number of stations 25. In carrying out the invention, these stations have at least one gate 26 for transfer of passengers to and from vehicles associated with the mainline track 14. These vehicles 11 are positioned at the gate 26 of the station 25 by movement along a siding track 27. It will be understood that a second gate (not shown) could be provided for transfer of passengers to and from a vehicle associated with an opposite mainline track (not shown in FIG. 2), and that this second gate and an attendant siding can be located at elevations differing from the first gate 26 and siding 27. Additional gates and stations can be provided as required to service additional tracks and locations.

Figure 3:
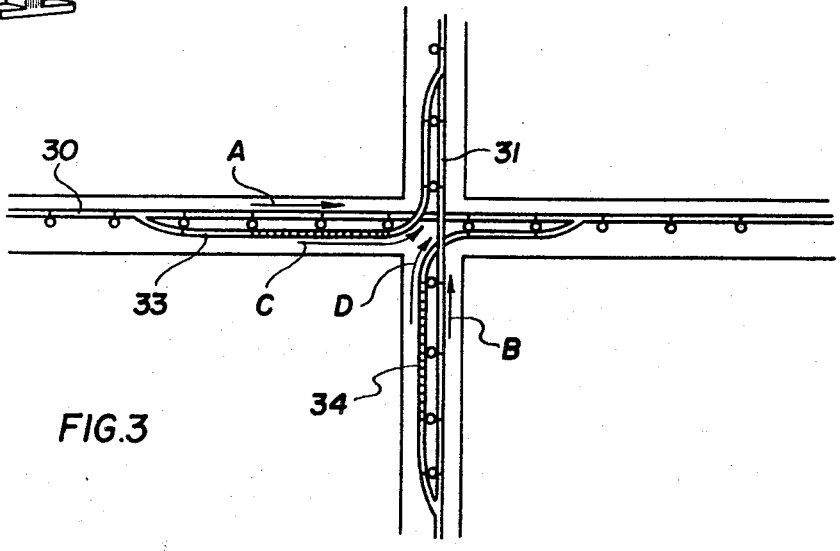
FIG. 3 is a fragmentary plan view showing a typical track layout intersection and interchange.

FIG. 3 shows a typical track cross-over and interchange utilizing the described principles of the invention. Presently, such interchanges and cross-overs require extensive amounts of supporting land or complex vehicular control devices if more than a small number of vehicular movements are to be accommodated. In accordance with the invention, therefore, a mainline track 30 is adapted for movement of depending vehicles in the direction indicated by the associated arrow A. A second mainline track 31 is adapted for movement of depending vehicles in the direction indicated by the associated arrow B. Vehicular traffic suspended from and moving along the mainline track 31 can pass over the intersecting track 30, and vehicular traffic suspended under track 30 will pass under track 31. Vehicular traffic can leave track 30 and enter track 31 by motion along an interchange track 33 in the direction indicated by the associated arrow C. Similarly, traffic can leave track 31 and enter track 30 by motion along an interchange track 34 in the direction indicated by the associated arrow D.

The following is claimed as invention:

1. A vehicle transportation system having a plurality of vehicles of predetermined height and a continuous track layout adapted to accommodate said vehicles for movement therealong, said track layout having at least a first mainline track for movement of vehicular traffic in one direction, and another mainline track for movement of vehicular traffic in another direction, said mainline tracks being separated by a relative elevation sufficient to permit vehicles moving among one track to pass across the other track without substantial gradient motion, said track layout being elevated above a supporting ground level and said vehicles being suspended below said tracks, the difference in said relative elevation between said tracks being greater than the vertical height of any suspended vehicle, spaced apart stanchion members for supporting said track system, said stanchion members including a single pillar and a plurality of arms for supporting a corresponding plurality of tracks.

2. A vehicle transportation system according to claim 1 wherein said mainline tracks are oriented substantially parallel to one another, vehicular traffic moving along said tracks in substantially opposite directions.

3. A system according to claim 1 wherein said track layout includes at least one turnoff track connecting with said mainline tracks and oriented to said mainline track to allow vehicles moving therealong to substantially change their direction of travel and pass across the other mainline track without substantial gradient motion.

4. A system according to claim 1 wherein said track layout includes at least one change over lane for transferring vehicles from one mainline track at one elevation to another mainline track at another elevation.

5. A vehicle transportation system having a plurality of vehicles of predetermined height and a continuous track layout adapted to accommodate said vehicles for movement therealong, said track layout having at least a first mainline track for movement of vehicular traffic in one direction, and another mainline track for movement of vehicular traffic in another direction, said mainline tracks being separated by a relative elevation sufficient to permit vehicles moving along one track to pass across the other track without substantial gradient motion, at least one station for permitting passengers to transfer between said vehicles and points external to the system, said station having at least one gate for transfer of passengers to and from vehicles associated with one mainline track, and a second gate for transfer of passengers to and from vehicles associated with the other mainline track, said first and second gates being relatively located at differing elevations.

* * * * *